United States Patent [19]

Svengren et al.

[11] Patent Number: 4,600,595
[45] Date of Patent: Jul. 15, 1986

[54] PREPARATION OF A ROLLED PASTRY PRODUCT

[75] Inventors: Anders G. Svengren, Ängelholm; Bertil A. Ganrot, Bjuv, both of Sweden

[73] Assignee: Nestec S.A., Vevey, Switzerland

[21] Appl. No.: 640,700

[22] Filed: Aug. 14, 1984

[30] Foreign Application Priority Data

May 2, 1984 [EP] European Pat. Off. ........ 84104918.2

[51] Int. Cl.⁴ .............................................. A21D 6/00
[52] U.S. Cl. ................................... 426/501; 426/502; 426/94; 425/294
[58] Field of Search ............... 426/502, 503, 496, 556, 426/297, 500, 501

[56] References Cited

U.S. PATENT DOCUMENTS 3,225,717  12/1965  Page ..................................... 426/501
3,342,144   9/1967  Pilliner ................................. 426/501
4,110,482   8/1978  Sato ..................................... 426/502

Primary Examiner—Raymond N. Jones
Assistant Examiner—Carolyn Paden
Attorney, Agent, or Firm—Vogt and O'Donnell

[57] ABSTRACT

A process for preparing a rolled pastry product in which a sheet of pastry material advancing on a conveyor belt is cut and folded into discrete pieces of a predetermined size and then rolled. The cutting and folding operation is carried out by an oscillating knife positioned above the conveyor belt which has a cutting edge extending laterally across the width of the conveyor belt, and which immediately after contacting and cutting through the advancing pastry sheet by means of its cutting edge, ascends and rotates in a direction such that the motional vector of the cutting edge is counter to the conveying direction thereby causing the forward edge of the pastry sheet to be lifted up and folded over. The knife then descends and rotates in the reverse direction so that the cutting edge contacts and cuts through the advancing pastry sheet behind the folded portion to separate a folded piece from the remainder of the pastry sheet.

8 Claims, 1 Drawing Figure

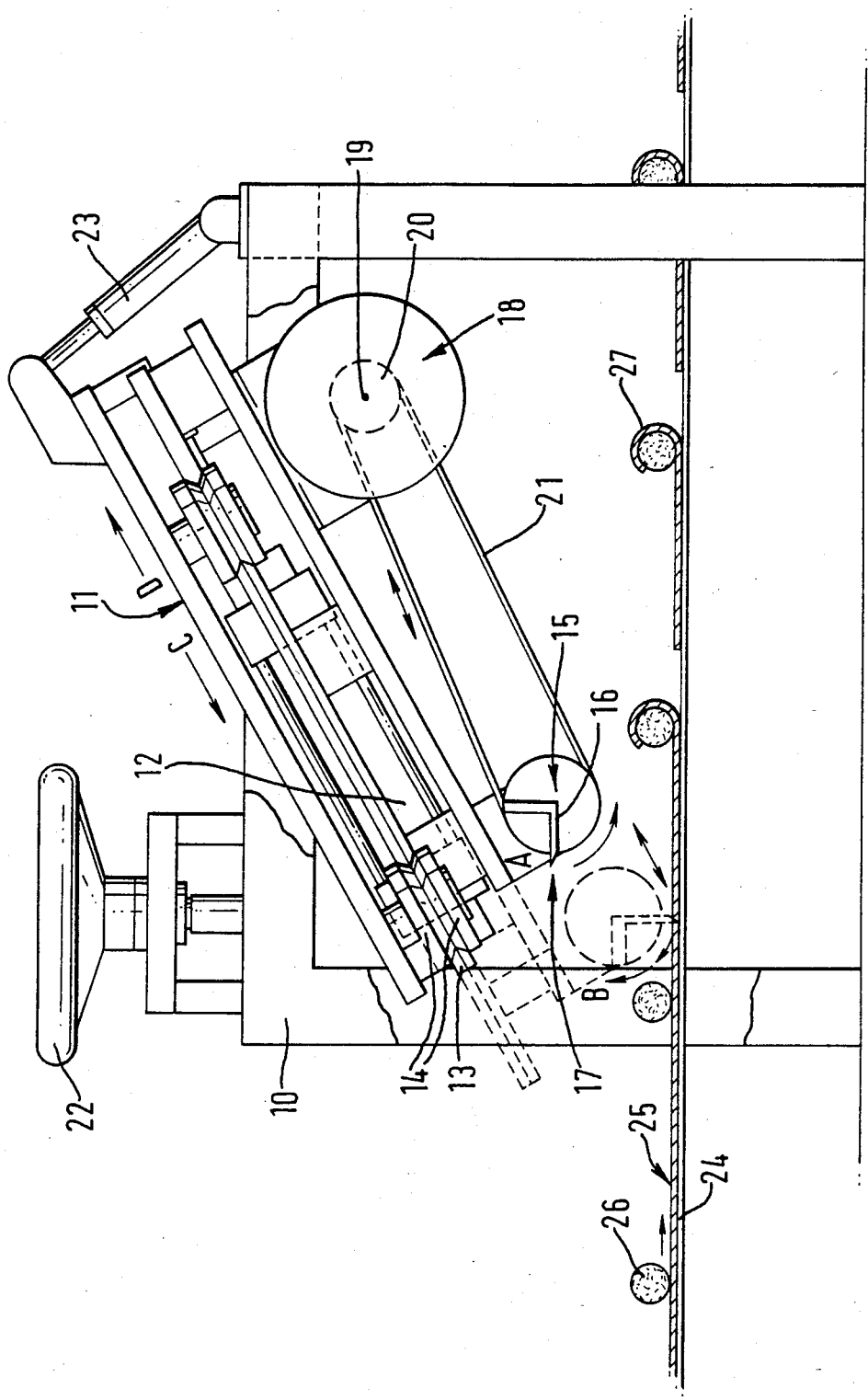

PREPARATION OF A ROLLED PASTRY PRODUCT

The present invention relates to a process for preparing a rolled pastry product, especially for cutting and rolling sheets of pastry material advancing on a conveyor belt.

In the preparation of rolled pastry products on a conveyor belt, such as pancakes or Swiss rolls, three distinct operations are required:

(1) distributing or dividing the pastry into discrete pieces of a predetermined size e.g. by means of a cutting mechanism or a dispenser (2) lifting up at least one edge to form a partially folded product (3) rolling the folded product.

Each of these three operations is carried out in a separate step and often complex folding devices are used which are not easy to maintain or clean.

We have developed a process where the cutting and folding operations are carried out in a single step using a rotatable knife which is easy to maintain and clean.

Accordingly, the present invention provides a process for preparing a rolled pastry product in which a sheet of pastry material advancing on a conveyor belt is cut and folded into discrete pieces of a predetermined size and then rolled characterised in that the cutting and folding operation is carried out by an oscillating knife positioned above the conveyor belt and having a cutting edge extending laterally across the width of the conveyor belt, which immediately after contacting and cutting through the advancing pastry sheet by means of its cutting edge, ascends and rotates in a direction such that the motional vector of the cutting edge is counter to the conveying direction causing the forward edge of the pastry sheet to be lifted up and folded over, and then rotates in the reverse direction and descends so that the cutting edge contacts and cuts through the advancing pastry sheet behind the folded portion to separate a folded piece from the remainder of the pastry sheet.

A plurality of cut and folded pieces of pastry material may be produced from the sheet of pastry material advancing on the conveyor belt by the knife repeating this oscillating movement. Thus, when the knife ascends and rotates so that the motional vector of the cutting edge is counter to the conveying direction, the forward edge of the advancing pastry sheet immediately behind the previously cut and separated folded piece is lifted up and folded over and when the knife reverses its direction of rotation again so that the cutting edge contacts and cuts through the advancing pastry sheet behind the folded portion, another folded piece is separated. By repeating this movement, several folded pieces of pastry product are formed which may afterwards by rolled by conventional methods e.g. on a conveyor provided with a roller. The knife is conveniently fixed on a shaft mounted laterally across the width of the conveyor belt. Means for oscillating the shaft are provided, for example, by an air cylinder. The angle through which the knife rotates should be sufficient to cause the forward edge of the pastry sheet to be lifted up and folded over and is usually at least 60° preferably at least 75°. The maximum angle through which the knife rotates is not critical but practically is not more than 180° and preferably not more than 120°.

Advantageously, the sheet of pastry material advances continuously along the conveyor belt and in this case, when the knife ascends and rotates to cause the forward edge of the pastry sheet to be lifted up and folded over, it also conveniently travels in the conveying direction, preferably at a speed slightly slower than the speed of the sheet of pastry material. This movement of the knife may be achieved by the oscillating shaft being fitted on a movable carriage which reciprocates so that when the knife rotates in the direction in which the motional vector of the cutting edge when it is immediately above the conveyor belt is counter to the conveying direction, it simultaneously travels in the conveying direction at an angle inclined upwards relative to the conveyor belt, and when the knife rotates in the reverse direction, it simultaneously travels in the opposite direction. The angle at which the movable carriage reciprocates relative to the conveyor belt is conveniently from 10° to 50° and preferably from 20° to 40°.

The process of the present invention is particularly applicable to the production of rolled filled pastry products especially batter based products such as pancakes. The filling is placed at intervals on the pastry sheet as it travels along the conveyor belt, preferably by extrusion e.g. by a volumetric piston filler, advantageously at spaced positions just behind the places where the edges will be formed when the pastry sheet is cut by the knife. In this position, when the knife has cut the pastry sheet and rotates counter to the direction of motion of the pastry sheet the forward edge of the pastry sheet is lifted up and folded over the filling.

The control of the knife is closely synchronised with the movement of the pastry sheet on the conveyor belt, preferably by an electronic processor. Where a filled product is being made, a signal may be sent to the knife, for example, by the filling activating a photocell.

After the folding operation, the folded pieces are transferred to the rolling device which comprises a separate conveyor provided with a roller mounted transversely above the conveyor belt. The conveyor belt of the rolling device preferably runs at a higher speed than the belt of the cutting and folding device in order to increase the distance between the folded pieces to that required for the rolling operation. By the method of this invention, the folded part of the pastry sheet covers the filling and can thus prevent contact between the filling and the final rolling device, thus ensuring that the rolling device remains clean.

In the preparation of pancakes, the pancake batter may conveniently be applied as one of more longitudinal sheets on to a steel belt conveyor heated from below by short wave infrared radiation, this apparatus being described in our co-pending European Patent Application No. 82109147.7. After baking, the pancake sheets are transferred to the conveyor belt used for filling, cutting and folding and after the folding operation, the folded pieces are transferred to the rolling device.

After rolling, the products may be deep-frozen or packed into cartons.

The present invention also provides an apparatus for cutting and folding a sheet of pastry material into discrete pieces of a predetermined size which comprises a conveyor belt above which is positioned an oscillating knife having a cutting edge extending laterally across the width of the conveyor belt, means for feeding a sheet of pastry material onto the conveyor belt, means for controlling the movement of the knife so that it contacts and cuts through the advancing pastry sheet by means of its cutting edge and then ascends and rotates in a direction such that the motional vector of the cutting edge is counter to the conveying direction causing the forward edge of the pastry sheet to be lifted up and folded over, and then descends and rotates in the reverse direction so that the cutting edge contacts and cuts through the advancing pastry sheet behind the folded portion to separate a folded piece from the remainder of the pastry sheet.

The present invention is further illustrated by way of example with reference to the accompanying drawing in which FIG. 1 is a side plan view (partly in section) of an apparatus of the present invention.

The apparatus of the present invention comprises a frame 10 on which is mounted a movable carriage 11 at an angle of 30° to the horizontal, which is operated by an air cylinder 12 to reciprocate in a direction controlled by a guide 13 on the movable carriage 11 and guide wheels 14 fixed to the frame 10. Fitted to the front end of the carriage is an oscillating shaft 15 firmly attached to which is a knife 16 with a cutting edge 17. Mounted on the rear end of the carriage is a rotary air cylinder 18 having a shaft 19 to which is fitted a drive wheel 20. A timing belt 21 is trained around drive wheel 20 and shaft 15 and imparts an oscillating movement to the shaft 15. A hand wheel 22 aided by hinged arm 23 can adjust the height of the knife. Below the movable carriage runs a conveyor belt 24 on which is distributed a layer of pancake material 25 having a thickness of 2 mm on which is dosed a suitable amount of filling 26 intermittently at regular intervals by conventional means (not shown). The portion of the apparatus shown by dashed lines indicates the position of the apparatus at the point where the knife cuts through the pancake (Position B). The movement of the apparatus is closely synchronised with the movement of the pancake material on the belt by means of a sequency controller, Omron Sysmac PO, manufactured by Omron Tateisi Electronics Co.

In operation, a sheet of pancake material 25 was fed from a batter applicator onto a steel belt conveyor heated from below by short wave infrared radiation described in our copending European Patent Application No. 82109147.7 (not shown). The pancake material was baked and then transferred via rollers (also not shown) to the conveyor belt 24. Portions of filling 26 were dosed intermittently at regular intervals onto the surface of the pancake material. When the pancake material 25 and the filling 26 are in the appropriate position, a photocell (not shown) is activated whereupon the carriage 11 moves downwards in the direction of the arrow C and at the same time, the knife 16 rotates 90° from the horizontal position A to position B so that it points downwards at the end of the movement when it contacts and cuts through the pancake material by means of its cutting edge 17. Immediately afterwards the carriage travels in the reverse direction (Arrow D) while at the same time the knife rotates in the opposite direction causing the forward edge of the cut pancake material to be folded over the filling to give a semi-rolled pancake 27. When the knife reaches position A the cycle recommences and another piece of pancake material is cut and folded over. The pancakes are completed by transfer of the semi-rolled pancakes to a separate conventional conveyor and roller (not shown)

We claim:

1. A process for preparing a folded pastry product comprising:
    (a) advancing a sheet of pastry material in a downstream direction on a conveyor belt and,
    (b) cyclically:
        (i) lowering, from above the sheet towards the belt, a knife having a cutting edge extending transversely to the downstream direction across the width of the sheet, so that the cutting edge of the knife cuts through the sheet to thereby sever a piece of the pastry material downstream of the knife from the remaining sheet upstream of the knife, leaving the cut, forward edge of the remaining sheet in contact with the cutting edge of the knife;
        (ii) lifting up the forward cut edge of the remaining sheet and folded it back upon the remaining sheet by raising the knife while rotating the knife in a first direction about a horizontal axis transverse to the downstream direction to impart to the cutting edge of the knife a motional vector counter to the downstream direction; and
        (iii) rotating the knife during the lowering step about the axis in a second direction, opposite to the first direction, whereby the edge folded on each cycle downstream of the knife is advanced on the belt before the knife cuts through the sheet in the next succeeding cycle.

2. A process according to claim 1 further comprising the step of rolling the folded pieces.

3. A process according to claim 1 wherein, on each cycle, the knife oscillates about said axis through an angle of from 75° to 120°.

4. A process according to claim 1 wherein the sheet of pastry material is continuously advanced on the conveyor belt further comprising the steps of moving the knife in the downstream direction during the lifting step of each cycle and moving the knife in the upstream direction during the lowering step of each cycle.

5. A process according to claim 4 wherein the raising and lowering motions and the upstream and downstream motions are imparted to the knife by reciprocating the knife along a path oblique to the belt.

6. A process according to claim 5 wherein the angle between the path of reciprocation of the knife and the conveyor belt is from 20° to 40°.

7. A process according to claim 4 wherein during the lifting step of each cycle the knife travels downstream at a slightly slower speed than the speed of the conveyor belt.

8. A process according to claim 1 further comprising the steps of placing portions of a filling at intervals along the pastry sheet and synchronising the movement of the knife with the movement of the pastry sheet on the belt so that each edge is folded over a portion of filling.

* * * * *

UNITED STATES PATENT AND TRADEMARK OFFICE
CERTIFICATE OF CORRECTION

PATENT NO. : 4,600,595

DATED : July 15, 1986

INVENTOR(S) : Anders G. Svengren, et al.

It is certified that error appears in the above—identified patent and that said Letters Patent is hereby corrected as shown below:

Column 4, line 22, Claim 1, "folded" should read -- folding --.

Signed and Sealed this

Eighteenth Day of November, 1986

*Attest:*

DONALD J. QUIGG

*Attesting Officer*  *Commissioner of Patents and Trademarks*